United States Patent
Budakoti et al.

(10) Patent No.: US 11,343,405 B1
(45) Date of Patent: May 24, 2022

(54) METHODS AND SYSTEMS FOR ADDING ONE OR MORE NEW IMAGES TO AN INPUT DOCUMENT

(71) Applicant: XEROX CORPORATION

(72) Inventors: Abhay Budakoti, Rae Bareli (IN); Sathyanarayanan Ranganathan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/197,183

(22) Filed: Mar. 10, 2021

(51) Int. Cl.
*H04N 1/387* (2006.01)
*H04N 1/00* (2006.01)

(52) U.S. Cl.
CPC ........... *H04N 1/387* (2013.01); *H04N 1/0044* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,429,559 B2 | 4/2013 | Gaucas et al. | |
| 9,405,772 B2 | 8/2016 | Petrou et al. | |
| 2005/0010553 A1* | 1/2005 | Liu | G06F 16/58 |
| 2008/0266597 A1* | 10/2008 | Ushio | G06K 15/005 |
| | | | 358/1.15 |
| 2010/0103472 A1* | 4/2010 | Kim | H04N 1/00225 |
| | | | 358/402 |

* cited by examiner

*Primary Examiner* — Frantz Bataille

(57) ABSTRACT

The present disclosure discloses methods and systems for adding one or more new images to an input document having one or more pages. The method includes receiving an input document from a user. Upon receiving the input document, a user interface having an option for adding one or more new images to the input document is provided to the user for selection. Once selected, one or more keywords are identified based on the content of the input document. Based on the identified keywords, one or more new images are searched via one or more sources and displayed to the user for selection. The user provides his input to add the selected images to a pre-defined area in the input document. Subsequently, the selected images are added to the pre-defined area of the input document, resulting in an output document, for further processing.

20 Claims, 10 Drawing Sheets

METHODS AND SYSTEMS FOR ADDING ONE OR MORE NEW IMAGES TO AN INPUT DOCUMENT

TECHNICAL FIELD

The present disclosure relates to the field of printing and/or scanning. More specifically, the disclosure relates to methods and systems for adding one or more new images to an input document based on content of the input document.

BACKGROUND

When a user submits a document for printing or scanning, he may wish to add new images to the document because of various reasons. For example, a user willing to take printouts of an e-book related to electrical motors may want to replace an existing two-dimensional image of a DC motor with a three-dimensional image that shows labelling of components of the DC motor. In another example, a user may want to replace a low-resolution company logo given in a document with a higher resolution logo. In yet another example, a user may wish to add one or more new images to a document having no images, before printing the document. In simple words, the user may want to add and/or replace any image in a document for better understanding and/or clarity.

Currently, the only option available with the user is to make changes to a document before submitting the document for printing and/or scanning. But, in this option, the user is required to perform multiple steps. For example, if the document is in a non-editable format (e.g., Portable Document Format), the user is first required to convert the document into an editable format. Then, the user needs to search for images that he wants to add to the document. Once searched, he then adds the images and performs formatting, resizing etc., before submitting the document for printing. Completing all these steps requires significant time and effort, and the user may not have the required time and patience to perform all these steps. In some cases, the user may not even have the required skill set to do formatting, resizing, etc.

Additionally, there can be scenarios where the user has already submitted the document for printing or scanning and wants to add images to the submitted document. Currently, there are no solutions available that allow the user to add images to the already submitted document. In view of the above, there is a need for systems and methods that enable/allow a user to add one or more new images to a document in a way that requires minimal effort and time of the user.

SUMMARY

According to aspects illustrated herein, a method for automatically adding one or more new images to an input document based on user's choice, is disclosed. The method includes receiving an input document from a user, where the document includes one or more pages. Upon receiving the document, a user interface including an option for adding one or more new images to the input document is provided to the user for selection. Once the user selects the option, one or more keywords are identified based on the content of the input document. Based on the identified one or more keywords, one or more new images are searched via one or more sources. Subsequently, the one or more new images are displayed to the user for selection via a user interface. The user provides his inputs via the user interface to select and add the one or more new images to the input document. The user also selects a pre-defined area where the selected one or more new images are to be added in the input document. For example, the pre-defined area can be an area of a pre-existing image in the input document, a new area on any page of the input document, or a new page that can be added to the input document. Based on the input received from the user, the one or more new images are added to the pre-defined area in the input document. As a result, an output document is obtained for further processing.

According to further aspects illustrated herein, a multi-function device for automatically adding one or more new images to an input document is disclosed. The multi-function device includes a controller for receiving an input document from a user, where the input document includes one or more pages. The controller identifies one or more keywords based on the content of the input document. Based on the identified one or more keywords, the controller searches for one or more new images via one or more sources. The controller then receives an input from the user for adding the one or more new images to the input document in a pre-defined area. Based on the input, the controller adds the one or more new images to the pre-defined area in the input document, resulting in an output document, for further processing. The multi-function device further includes a user interface for providing an option to the user, for adding the one or more new images to the input document. The user interface also displays the one or more new images to the user for selection.

According to furthermore aspects illustrated herein, a system for automatically adding one or more new images to an input document is disclosed. The system includes a multi-function device and a server communicatively coupled to the multi-function device. The multi-function device receives an input document from a user, where the input document includes one or more pages. The multi-function device provides a user interface including an option for adding one or more new images to the input document, for selection by the user. The multi-function device then sends the received input document and the option selected by the user to the server, for further processing. The server identifies one or more keywords based on the content of the input document. Based on the identified one or more keywords, the server searches one or more new images via one or more sources and displays the one or more new images to the user, for selection. Upon receiving an input for adding the one or more new images to the input document in a pre-defined area, the server adds the one or more new images to the pre-defined area in the input document. This results into an output document, for further processing.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
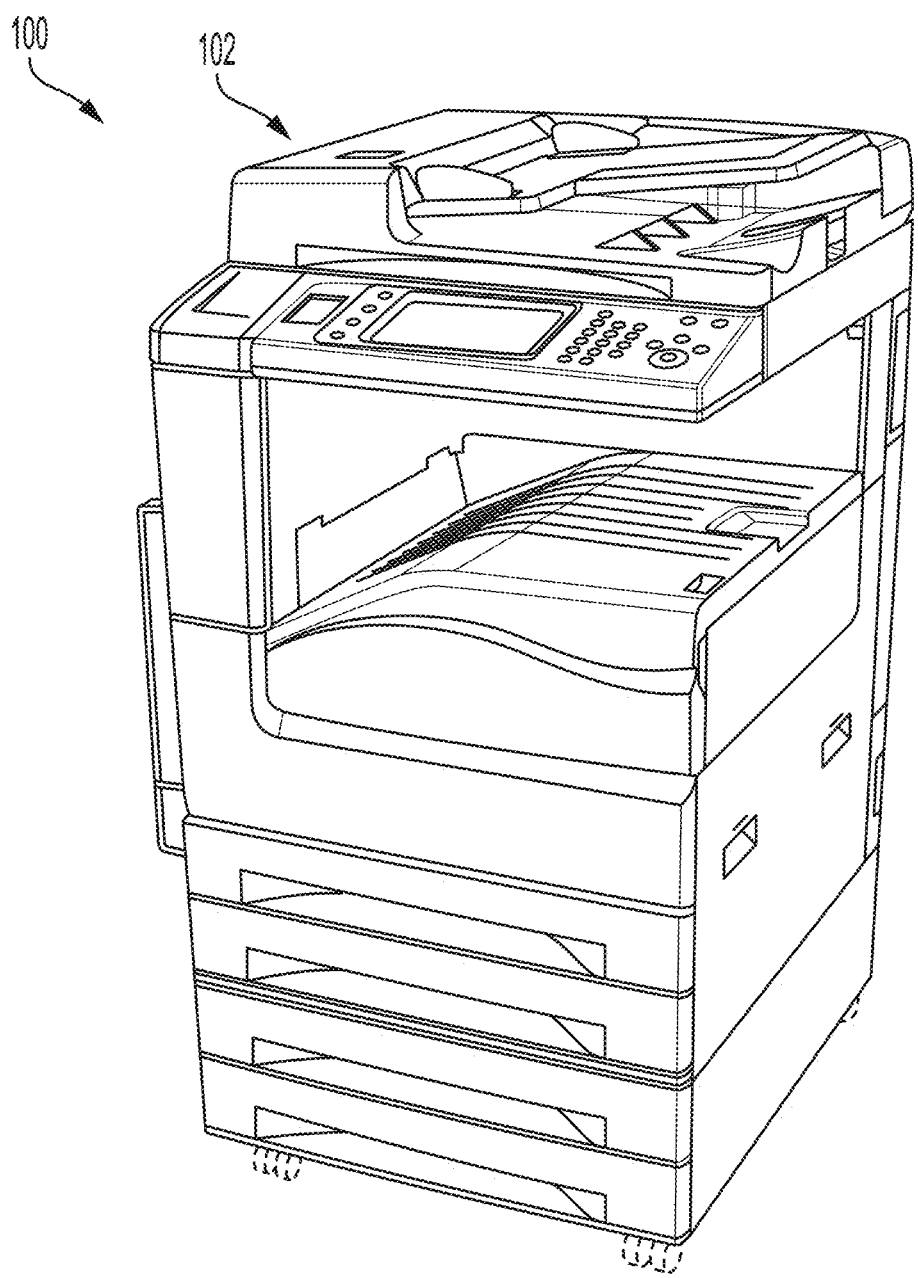
FIGS. 1A and 1B show exemplary environments in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" refers to a single device or a combination of multiple devices, to perform one or more functions such as, but not limited to, printing, imaging, scanning, and so on. The multi-function device may include software, hardware, firmware, or a combination thereof. In the context of the current disclosure, the multi-function device allows a user to add one or more new images to an input document. The new images can be added to replace a pre-existing image or can be added as additional images in the input document. For example, the one or more new images are added such that the added new images provide more details and/or brings clarity about the content of the input document.

The term "input document" refers to a document to which a user wants to add one or more new images. The input document can be a document submitted by a user for printing. Alternatively, the input document can be obtained after scanning a printed version of the document. The input document includes content in the form of text, image, graphics, or a combination thereof.

The "output document" refers to a document resulted after adding the one or more new images to the input document.

The term "adding one or more new images" include at least one of: adding one or more new images to the input document in addition to the pre-existing image(s) or replacing the pre-existing image(s) in the input document with the new image(s).

The term "pre-defined area" refers to an area in the input document where the user wishes to add the one or more new images. The pre-defined area can be an area occupied by a pre-existing image in the input document, a new area on a pre-defined page of the input document, or a new page.

Overview

The present disclosure provides methods and systems for automatically adding one or more new images to an input document. The methods and systems can be implemented at a multi-function device. In other examples, the methods and systems can be implemented at a print driver. In further examples, the methods and systems can be implemented at a server. These are few examples, but the methods and systems can be implemented at any system having a functionality to add one or more images to the input document.

The methods and systems identify one or more keywords from the input document such that the keywords are identified based on the content of the input document. These keywords are then used to search for one or more new images. For example, if the keyword is cosmos, the new images searched may be of "solar system", "galaxy", "space", etc. The one or more new searched images are then suggested/displayed to the user for selection. The user can select any of the suggested new images. Based on the user's selection, the one or more selected new images are added to the input document, resulting into an output document. This way, the methods and systems automatically add the one or more new images to the input document as per user's choice and facilitate an easy way of adding the new images in the input document.

Exemplary Environment

FIG. 1A shows an exemplary environment 100 in which various embodiments of the disclosure can be practiced. The environment 100 includes a multi-function device 102 capable of performing one or more functions such as printing, copying, scanning, faxing, and so on. Various examples of the multi-function device 102 may be a printer, a multi-functional printer, multi-function peripheral device, or the like.

In the context of present disclosure, the multi-function device 102 provides a feature of adding one or more new images to an input document. The feature of adding the new images can be used by a user when the input document is already submitted at the multi-function device 102 for printing or other services. But the feature can be used by the user when the user simply wishes to add the new images to the input document but may or may not wish to print the document. The input document can be a document (i.e., a digital version) which is submitted by the user for printing. Alternatively, the input document can be a document obtained after scanning. In the latter case, the user has a printed version of the document which is scanned at the multi-function device 102 to obtain a digital version. The obtained digital version represents the input document for further processing.

Once the input document is submitted, the multi-function device 102 provides a user interface including an option to add one or more new images to the input document. The user selects the option of adding one or more new images to the input document through the user interface. Upon selecting the option, the multi-function device 102 initiates processing for adding the one or more new images to the input document. The multi-function device 102 identifies one or more keywords based on the content of the input document. Based on the identified one or more keywords, the multi-function device 102 then searches for one or more new images related to the identified keywords and displays the searched one or more new images to the user via the user interface. The user then selects one or more of the displayed new images and a pre-defined area in the input document, where the pre-defined area is an area in the input document where the user wishes to add the selected new images. Based on the user selection, the selected new images are added to the input document. This way, the new images are added to the input document based on user's choice and without requiring any manual effort/time for searching and/or adding the new images.

Figure 1B:
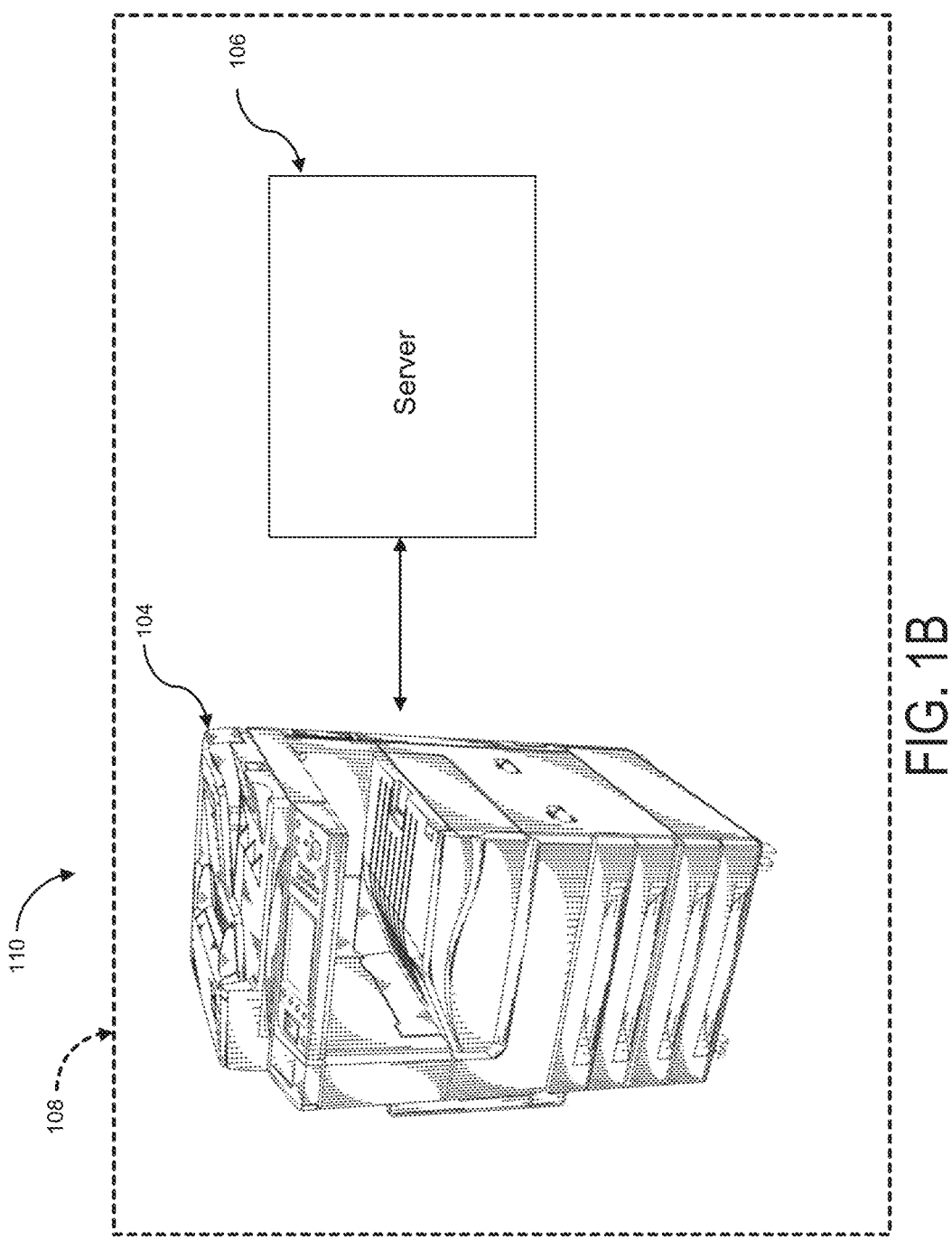

FIG. 1B shows another exemplary environment 110 in which various embodiments of the disclosure can be practiced. The environment 110 includes a multi-function device 104 that is communicatively coupled to a server 106. The multi-function device 104 and the server 106 collectively forms a system 108. In implementation of FIG. 1A, the multi-function device 102 performs all functionalities of adding the one or more new images, whereas in implementation of FIG. 1B, the multi-function device 104 receives the input document and sends the input document to the server 106 for processing. The server 106 then processes the input document to add the one or more new images to the input document.

In detail, the multi-function device 104 receives the input document from the user as discussed above. Once the input document is received at the multi-function device 104, the user selects an option of adding one or more new images to the input document. Upon selection, the multi-function device 104 sends the received input document to the server 106 for further processing i.e., for adding the one or more new images. If the input document is a document received from the user for printing, the multi-function device 104 directly sends the input document to the server 106 for processing. But if the input document is a printed document received from the user, the multi-function device 104 first scans the document and converts the document into a digital form and then sends the input document to the server 106 for processing.

The server 106 receives the input document and performs all functionalities of adding the one or more new images to the input document. For example, the server 106 identifies one or more keywords, searches one or more new images related to the keywords, and adds these images to the input document to a pre-defined area as selected by the user. In one example, the keyword identified by the server 106 is "electric motor". Based on this keyword, the server 106 searches and suggests one or more new images related to the electric motor to the user via the user interface of the multi-function device 104. The one or more new images may include a three-dimensional exploded view of an electric motor, a two-dimensional electric motor with labelling of all the components, etc. The user selects any or all of the suggested new images via the user interface. Based on user's selection, the server 106 adds the selected one or more new images to the pre-defined area selected by the user in the input document. Once the one or more new images are added, an output document is obtained that is sent to the multi-function device 104 for further processing including, but not limited to, printing, sharing, storing, or the like. More structural and implementation details related to the server 106 will be discussed below in FIG. 2B.

Exemplary Multi-Function Device

Figure 2A:
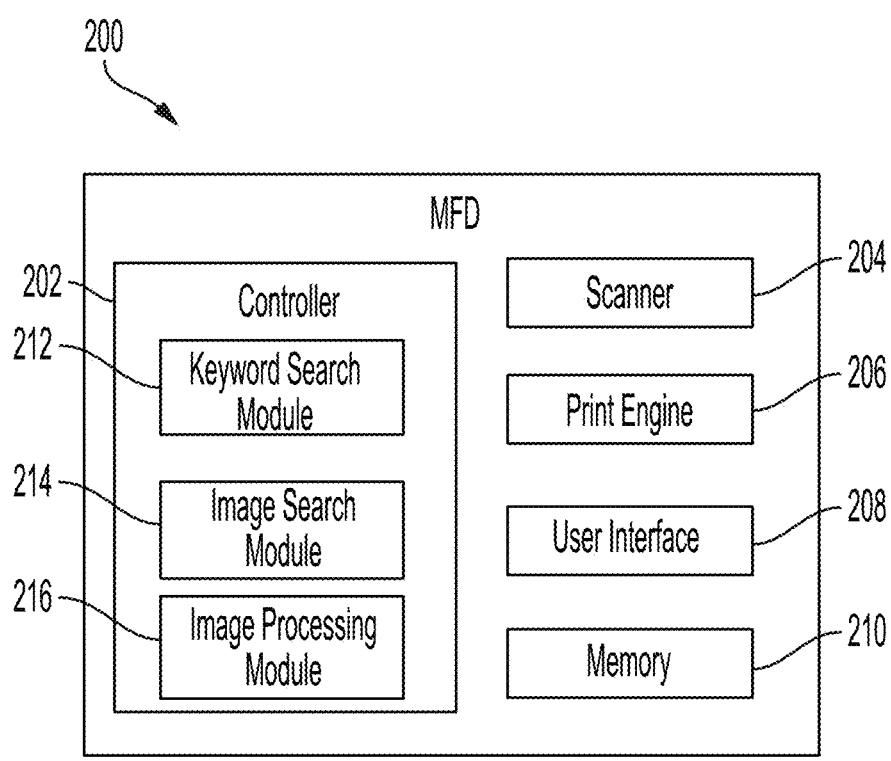
FIG. 2A is a block diagram illustrating various components of a multi-function device, in accordance with an embodiment of the present disclosure.

FIG. 2A illustrates a block diagram of a multi-function device 200 for implementing the current disclosure. As illustrated, the multi-function device 200 includes a controller 202, a scanner 204, a print engine 206, a user interface 208, and a memory 210. As shown, the controller 202 includes one or more components for implementing the current disclosure such as a keyword search module 212, an image search module 214, and an image processing module 216. But all functionalities of these components 212-216 can be directly incorporated in the controller 202 to implement the current disclosure without limiting the scope of disclosure. The multi-function device 200 may include additional component(s) as required to implement the present disclosure. The multi-function device 200 may perform functions and operations similar to the multi-function device 102 of FIG. 1A. The components 202-216 are connected to each other via a conventional bus or a later developed protocol and these components 202-216 communicate with each other for performing various functions of the present disclosure.

The implementation begins when a user wishes to add one or more new images to an input document. The input document includes content in the form of text, image, graphics, or a combination thereof. The input document may include at least one image or may not include any image. The at least one image already included in the input document may be called as a pre-existing image or an existing image. In one example, the user may want to replace the pre-existing image of the input document with one or more new images. In second example, the user may want to replace one pre-existing image of multiple images in the input document with one or more new images. In another example, the user may want to add one or more new images in addition to the pre-existing image. In further example, the user may want to add one or more new images to the input document even if the input document has no image.

The input document may be in the form of a digital version or may be in printed form. If the input document is already in the digital version, it is directly submitted at the multi-function device 200 for further processing. In case the input document is a printed version, the user first scans the document via the scanner 204 of the multi-function device 200 and obtains a digital version of the input document. But in some cases, the user can scan the printed version of the document using his personal device, such as a mobile device, in order to obtain the digital version of the input document. For example, the input document can be scanned using a camera of the mobile device. Once obtained, the user then submits the input document at the multi-function device 200. This way, the input document is submitted at the multi-function device 200 for further processing.

Figure 3A:
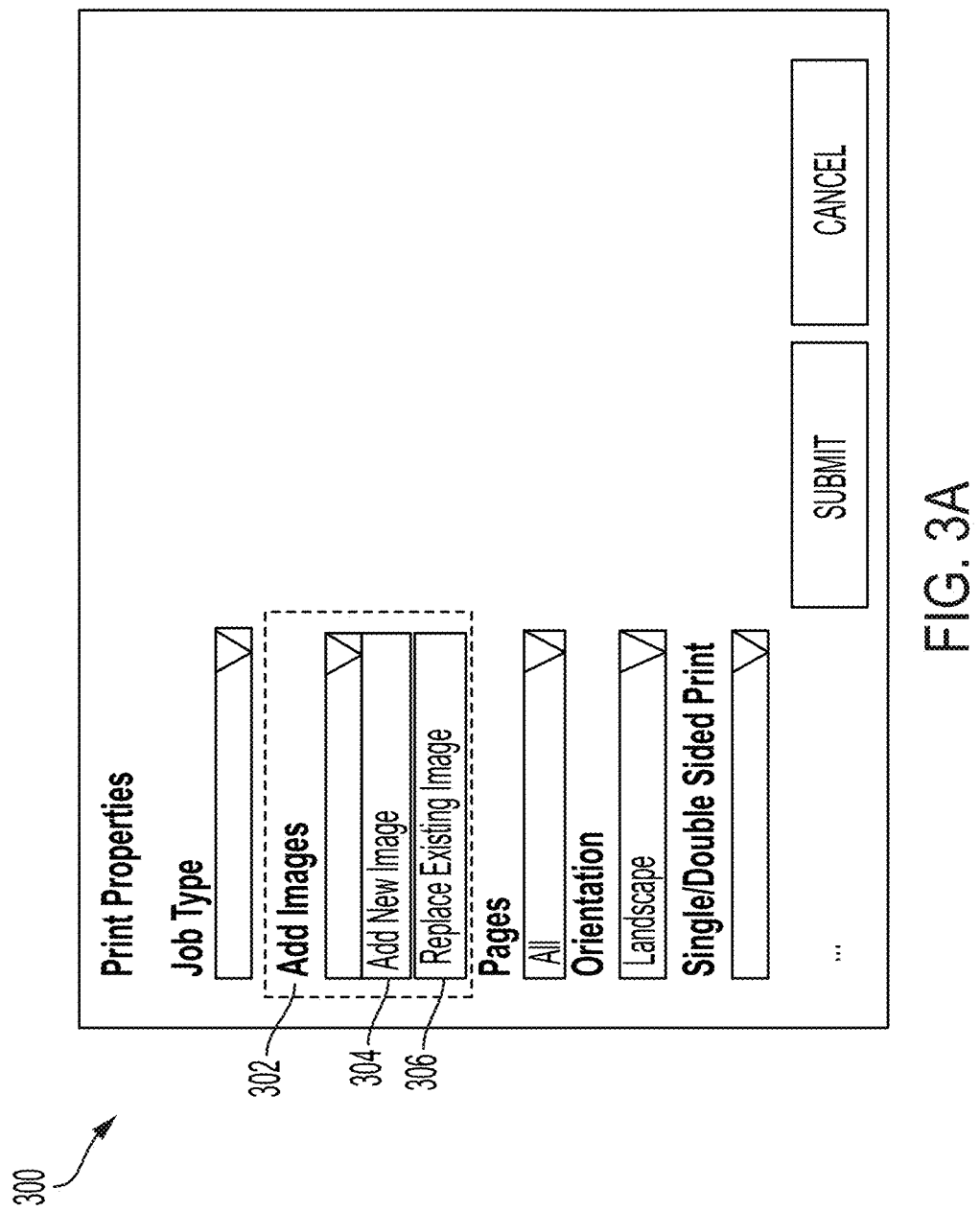
FIGS. 3A-3B show exemplary snapshots of a user interface providing an option to add one or more new images to an input document.

The controller 202 provides an option to the user to add one or more new images to the input document through the user interface 208. The user selects the option to add one or more new images via the user interface 208. One exemplary user interface 300 having such option is shown in FIG. 3A. Here, the user interface 300 includes an option 302 "Add Images" for adding one or more new images to an input document. Upon selection of the option 302 by the user, the user interface 300 further provides two sub-options—a) "Add New Image" (marked as 304), and b) "Replace Existing Image" (marked as 306). The user may select the sub-option 304 if he wishes to add one or more new images to the input document in addition to the pre-existing one or more images in the input document. The user may select the sub-option 306 if he wishes to replace any existing image(s) in the input document. The user may select any of the options 304 and 306 or both the options 304 and 306. For instance, the user may wish to add one or more new images and further wish to replace a pre-existing image in the input document with a new image. For easy discussion, it can be considered that the user selects the sub-option 306 to replace at least one pre-existing image in the input document with one or more new images.

Figure 3B:
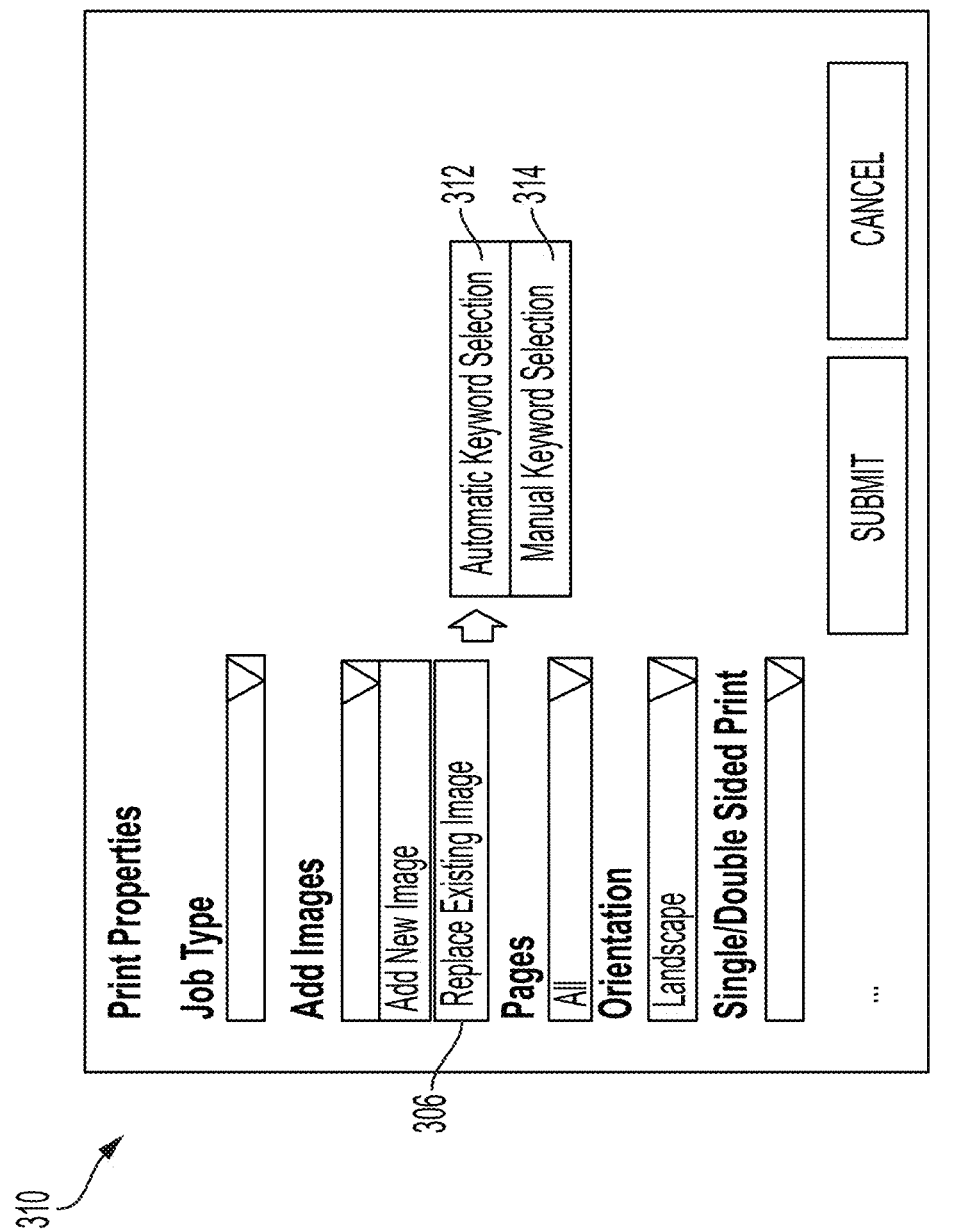

Post selecting the sub-option 306, additional options are provided to the user via a user interface. One such exemplary user interface 310 including the additional options is shown in FIG. 3B. As shown, the additional options include—automatic keyword selection (marked as 312) and manual keyword selection (marked as 314). The option 'automatic keyword selection' 312 automatically identifies one or more keywords based on the content of the input document. While in 'manual keyword selection' option 314, the user is required to provide his inputs related to one or more keywords through the user interface 208. For example, if the user selects the option 314, the controller 202 or keyword search module 212 automatically identifies the keywords from the input document and displays to the user. The user can then select any specific keyword of the displayed keywords, for searching the new images. The user can further make any modifications to the displayed keywords, for example, the user can add keywords, modify keywords, delete keywords and so on. In another example, the user can directly provide/input one or more keywords through the user interface 208, based on which the new images can be searched. These are exemplary implementations but the options 312 and 314 can be configured in any suitable manner for implementing the present disclosure.

This way, the controller 202 receives all the selection from the user. The controller 202 then checks if the input document is in a searchable format such as .doc format. In case the document is in a non-searchable format, for example, .pdf format, the controller 202 converts the input document to a searchable format such as .doc format or any other suitable formats. The controller 202 may use a suitable application such as Acrobat Pro or any other application for converting the input document to a searchable format.

Once the document is converted to a searchable format, the controller 202 triggers other modules such as keyword search module 212, image search module 214 and image processing module 216. If the user selects the automatic keyword selection option, the controller 202 triggers the keyword search module 212 to identify the keywords. The keyword search module 212 analyzes the content of the input document and identifies one or more keywords from the input document.

In one example, the keyword search module 212 identifies the one or more keywords from the input document using a keyword/entity extraction technique known as "Named Entity Recognition" i.e., NER, where the technique may be ontology based, deep learning NER, or other known or later developed techniques. The NER technique searches keywords from the input document, extracts the identified keywords, and classifies the extracted keywords into one or more pre-defined categories. Various pre-defined categories may be names of people, locations, organizations, medical codes, time expression, quantities, monetary values, percentages, and so on. In one example where an input document includes a sentence "Bill Gates is one of the co-founders of Microsoft Corporation", the keyword search module 212 parses the sentence to extract the keywords. The keyword search module 212 classifies the extracted keywords into following three pre-defined categories: a) "Person": Bill Gates, b) "Company": Microsoft Corporation, and c) "Location": United States.

In some implementations, the keyword search module 212 may be an AI module that takes the input document and runs Optical Character Recognition (i.e., OCR) to extract text content from the input document. The text content acts as an input to the custom NER model that provides all named entities. Once the named entities are obtained, templates text are added to frame keywords. In some examples, the AI module that can further establish the relationship between the named entities can be used to identify keywords.

One exemplary sentence/string in the input document may be "Incredible, Chicago city officials estimate that there's a record 5 million people at Cubs parade". Here the identified named entities are: "Chicago", "LOCATION", "5 million", "NUMBER", and "Cubs", "ORGANIZATION". Accordingly, the template for framing keywords can be: Map for <LOCATION>: Map for Chicago, Flag for <COUNTRY>: Flag for U.S.A, and Logo for <ORGANIZATION>: Logo for Cub. And an example of Framing Keywords can be: Map for Chicago, Flag for U.S.A, and Logo for Cubs.

Those skilled in the art will appreciate that various approaches or techniques may be employed for identifying or extracting keywords without departing from the scope of the disclosure. Some exemplary techniques may include Lexicon approach, Rule-based systems, Machine learning-based systems, Hybrid approach, as known or later developed ways.

Once the keywords are identified, the keyword search module 212 displays the keywords to the user via the user interface 208 for his confirmation and/or inputs in case the user previously selected the 'manual keyword selection' option (marked as 314 in FIG. 3B). Here, the user can select one or more of the displayed keywords, add more keywords to the displayed keywords, make edits to the displayed keywords, delete any keywords, or a combination thereof. In simple words, the selection of the 'manual keyword selection' option allows the user to provide his inputs to the keywords displayed via the user interface 208. For example, the user can select/add/edit/delete one or more keywords. In another scenario, if the user selects the "Automatic Keyword Selection" option (marked as 312 in FIG. 3B), no inputs from the user may be required and the keywords identified by the keyword search module 212 may be directly used for searching. The manual and automatic keyword selection options can be implemented in any suitable way without limiting the scope of current disclosure. For instance, the manual keyword selection option may allow the user to directly input one or more keywords of his choice, for which he wishes to add new images.

Once the keywords are identified and/or selected, the keyword search module 212 sends the selected keywords to the image search module 214. The image search module 214 searches one or more new images related or relevant to the keywords. The image search module 214 searches for one or more new images via one or more sources such as database, the Internet, etc. For example, the image search module 214 searches for relative or similar images from the Internet or the database. In one example, the database may be an image database having a huge number of images stored on various subjects. The database may be a part of the multi-function device 200 and referred to as local database or the database may be present/hosted over third-party servers or the Internet. The database may store the images with notations, where the notations help identify or establish the relationship of objects present in an image. The database refers to any form of storage such as a memory, a hard disk, in a Universal Serial Bus (USB) drive, third party cloud servers and so on. The image search module 214 may be Artificial Intelligence (AI) based module that suggests relevant and/or customized images based on the identified keywords and/or user's choice. This way, the image search module 214 searches for the one or more new images related/relevant to the keywords.

The one or more new images are then displayed or suggested to the user via the user interface 208 for user selection. The user selects at least one new image that he wishes to add to the input document. Once selected, the user interface 208 further displays an option to the user to select a pre-defined area in the input document. In particular, the image processing module 216 requests the user to select the pre-defined area via a preview of the input document. Here, the user selected pre-defined area is an area where the user wishes to add the selected new image. For example, the pre-defined area may be an area of the pre-existing image, a new area on a pre-defined page, a new page. In an example, if the user wishes to replace an existing image in the input document, the user selects an area that is pre-occupied by the existing image in the input document. In other examples, the user selects any new area on a pre-defined page such as a new area on the page with the pre-existing image or a new area on a different page. In further example, the pre-defined area may be a new page which is added to the input document.

Once the user submits his selection of the new image and the pre-defined area through the user interface 208, the image processing module 216 adds the selected new image to the pre-defined area in the input document. For example, the image processing module 216 replaces the pre-existing image with the selected new image. To this end, the image processing module 216 first identifies the area of the pre-existing image and then matches the size of the selected new image with the area or size of the pre-existing image. The image processing module 216 may optionally resize the selected new image to fit into the pre-defined area of the existing image. Once done, the image processing module 216 superimposes the selected new image on the existing image. Alternatively, the image processing module 216 removes the pre-existing image first and then adds the selected new image to the pre-defined area. In other words, the image processing module 216 overwrites the pre-existing image with the selected new image. In examples, where the user opts for adding the selected new image to a new page of the input document, the image processing module 216 first adds a new page to the input document and then adds the new image to the added page. The image processing module 216 re-sizes the selected new image according to the size of the selected area. If user has selected to add the new image on a separate page, then the image processing module 216 adds the image to the last page, for example. But the image processing module 216 may insert the new page anywhere as required in the input document and then adds the selected new images. If the new image size is bigger than the page size, the image processing module 216 resizes the new image so that the new image can fit to a full page. In other cases, the image processing module 216 can add the selected new image in its original size.

This way, the image processing module 216 adds the user selected new image to the pre-defined area that results into an output document. The output document is then processed by the controller 202. The controller 202 displays a preview of the output document including the new image through the user interface 208, for user's confirmation. If the selected new image is added as per his choice, the user can provide his confirmation via the user interface 208. The controller 202 further processes the output document. The controller 202 here displays a number of options to the user such as print, send to email, store to a device, and so on. The user can select any of the displayed options through the user interface 208. For example, if the user chooses to print the output document, the controller 202 triggers the print engine 206 to print the output document. In another example, if the user chooses to send the output document via email, the controller 202 sends the output document to an email address. Here, the user is required to provide the email address where he wishes to send the output document. In yet another example, if the user chooses to store the output document, the controller 202 stores the output document to one or more storage devices such as a hard drive, USB drive, a cloud server, and so on.

The memory 210 stores the input document and all details/options as selected by the user. The memory 210 may store all necessary details such as keywords identified, images searched, images displayed and so on for implementing the present disclosure. The controller 202 may retrieve the required details from the memory 210 to implement the current disclosure.

The user interface 208 displays the option for adding one or more new images and further sub-options included in it. The user interface 208 may also display any required messages or alert to the user for implementing the disclosure. The user interface 208 allows the user to perform any selection such as option for adding new images, manual key selection, automatic key selection and so on. The user interface 208 further allows the user to select any specific keyword, modify any listed keywords, delete any keywords, add any keyword, or a combination thereof.

Although FIG. 2A is discussed where the user adds a new image to replace a pre-existing image in the input document, but the disclosure can be implemented for other scenarios where the user wishes to add one or more new images in addition to the pre-existing image(s) in the input document, or the like.

Figure 2B:
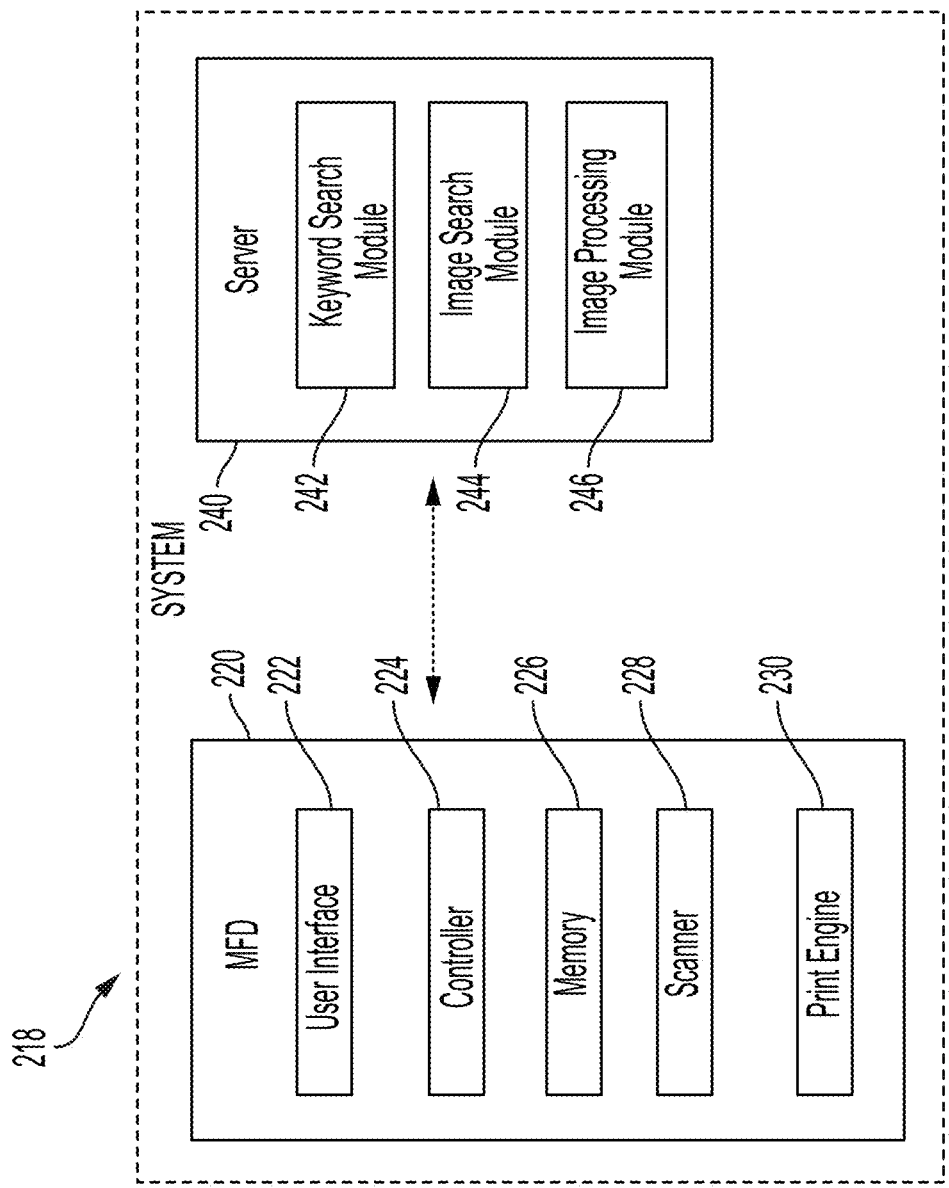
FIG. 2B is a system including a multi-function device and a server, in accordance with an embodiment of the present disclosure.

FIG. 2B is a system 218 including a multi-function device 220 and a server 240, where the multi-function device 220 is communicatively coupled to the server 240 via a communication network to perform various tasks. The communication network may be a wireless network, a wired network, or a combination thereof. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

As shown, the multi-function device 220 includes a user interface 222, a controller 224, a memory 226, a scanner 228, and a print engine 230, while the server 240 includes a keyword search module 242, an image search module 244, and an image processing module 246. The multi-function device 220 and the server 240 may perform functions and operations similar to the multi-function device 104 and the server 106 of FIG. 1B, respectively. The system 218 may include additional component(s) as required to implement the present disclosure. In FIG. 2A the multi-function device 200 implements the present disclosure, whereas in FIG. 2B, the multi-function device 220 and the server 240 together implements the present disclosure. For example, the multi-function device 220 sends the received input document to the server 240 for processing.

In operation, an input document from a user is received at the multi-function device 220, where the input document includes one or more pages. The input document is submitted at the multi-function device 220 for printing and the user wishes to add one or more new images to the input document before printing. The input document may be submitted at the multi-function device 220 simply for adding the one or more new images to the input document. Once the document is submitted by the user, the multi-function device 220, specifically, the controller 224 receives the input document. The controller 224 then provides a user interface 222 with an option to add one or more new images to the input document as discussed above in detail.

Upon receiving the document and the selected option from the user, the multi-function device 220 sends the input document to the server 240 for processing. If the user has a printed version of the document, the multi-function device 220 first scans it. Specifically, the scanner 228 scans the printed document and converts into a digital version of document i.e., the input document. This way, the multi-function device 220 sends the input document to the server 240.

Upon receiving the input document, the keyword search module 242 parses the input document to identify one or more keywords based on the content of the input document. The keyword search module 242 automatically identifies one or more keywords from the input document based on one or more parameters. Exemplary parameters may be frequency of occurrence of a keyword in the input document, correlation of a keyword with the existing images in the input document, and so on. The keyword search module 242 works in a manner similar to the keyword search module 212 of FIG. 2A. In case the user selects the manual keyword selection option, the identified keywords are provided to the user via the user interface 222 for his inputs, and the user can add/edit/delete/select the keywords as per his choice.

Based on the identified/selected keywords, the image search module 244 searches for one or more new images related to the keywords. The image search module 244 searches the one or more new images via one or more sources such as database, the Internet, etc. The image search module 244 sends the searched images to the multi-function device 220 for displaying to the user.

Here, the searched one or more new images are displayed to the user via the user interface 222 for his selection. The user selects at least one new image that he wishes to add to the input document. Subsequently, the user interface 222 displays an option asking the user to select a pre-defined area in the input document, where the pre-defined area is an area where the user wishes to add the selected new image in the input document. For example, if the user wishes to replace an existing image with the new selected image, the user selects an area that is occupied by the existing image in the input document. In other examples, the user may select a new page or a new area on a pre-defined page.

Once the user submits his selection of the new image and the pre-defined area, the image processing module 246 adds the selected new image to the selected pre-defined area in the input document. The image processing module 246 deletes the existing image and adds the new image in the area of the existing image. The image processing module 246 may perform a number of operations such as resizing, cropping, improving image quality/resolution etc. such that the selected new image fits in the pre-defined area. This way, the image processing module 246 adds the user selected new image to the input document, resulting into an output document.

The image processing module 246 or the server 240 then sends the output document to the multi-function device 220. The controller 224 then displays a preview of the output document to the user via the user interface 222 for user's confirmation. Once the user confirms, the controller 224 then further proceeds with processing the output document. For example, if the user wishes to print, the output document is printed via the print engine 230. If the user wishes to send the output document, the output document is sent to the required email address, may be user email address or user' friend email address. If the user wishes to store the output document, the output document is stored in a user selected storage device such as USB, hard disk, cloud server, or the like.

The memory 226 stores the input document and all details/options selected by the user via the user interface 222. The memory 226 also stores the output document and other details received from the server 240 after adding the one or more new images. The memory 226 may store other required details as well and further the controller 224 may retrieve required details from the memory 226 to implement the current disclosure.

Exemplary Snapshots

Figure 4A:
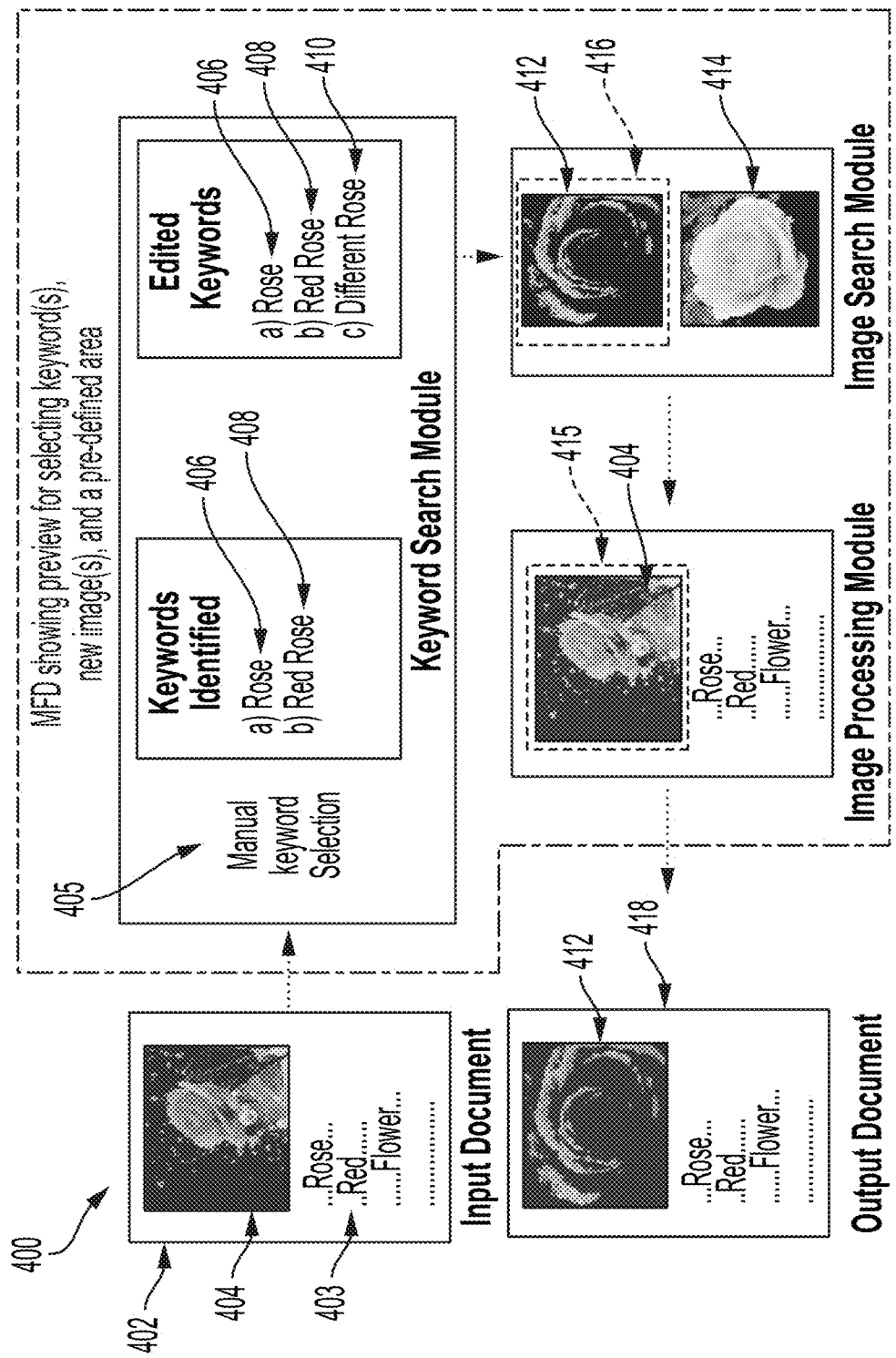
FIGS. 4A-4C show exemplary implementations of the present disclosure.
Figure 4B:
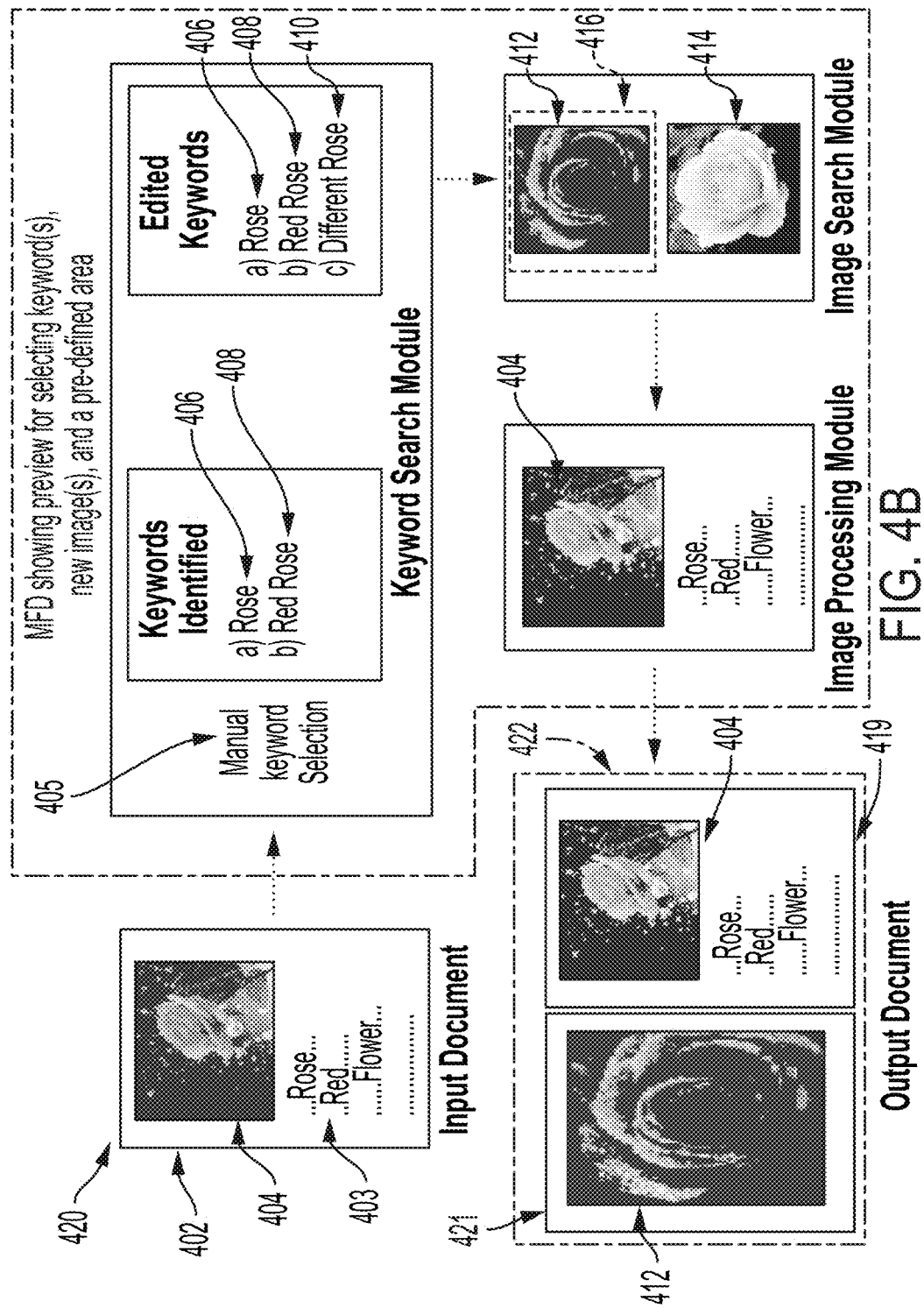
Figure 4C:
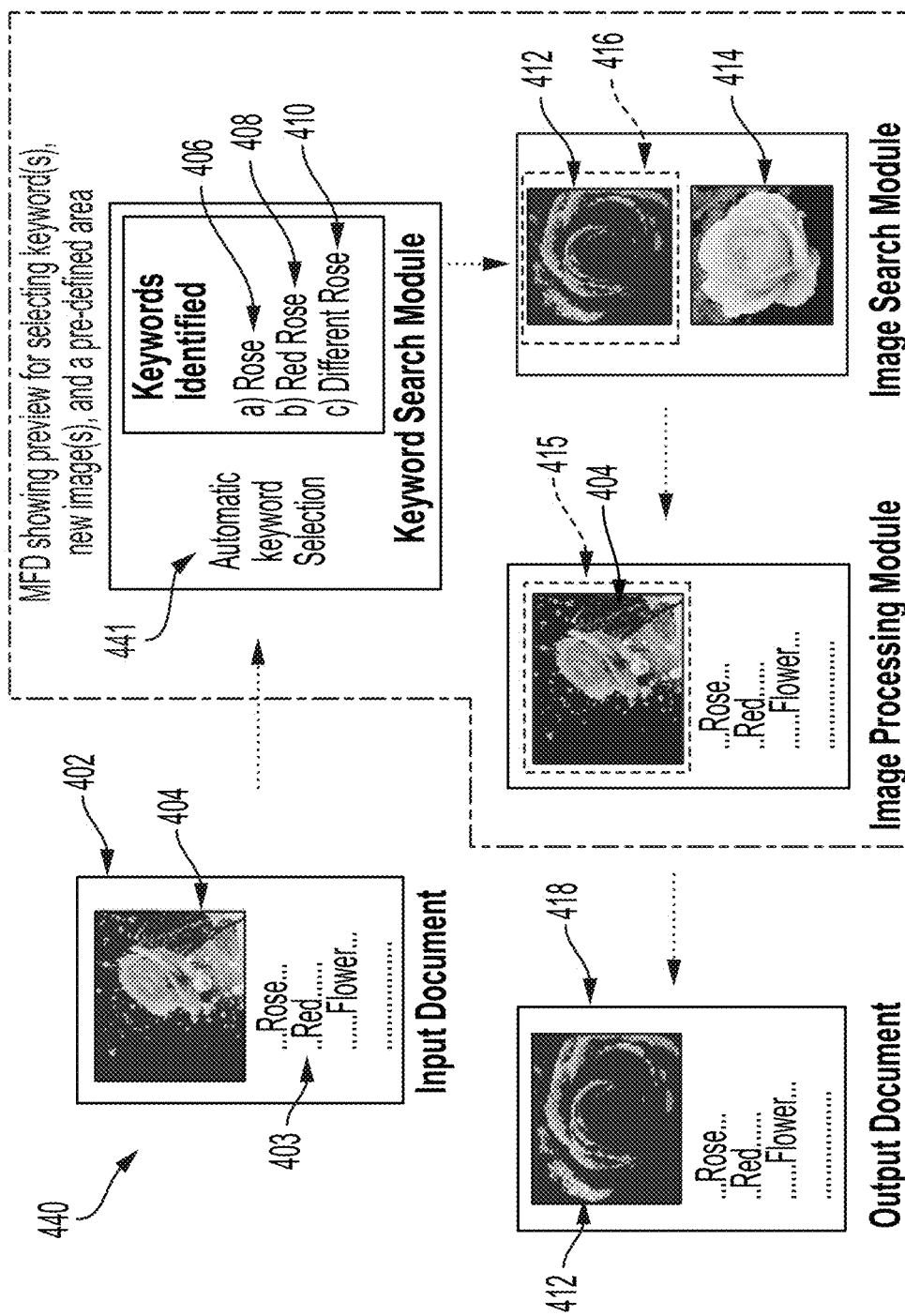

FIGS. 4A-4C showcase exemplary snapshots of the present disclosure. As shown in the implementation 400 of FIG. 4A, the user submits an input document 402 for adding one or more new images to it, where the input document 402 includes an image 404 of a pink rose (although color not visible) and text content 403. Here, it can be considered that the user wishes to replace the image 404 with a new image and further selects a manual keyword selection option 405. The input document 402 is submitted at the multi-function device such as 200 for further processing. The keyword search module 212 of the multi-function device 200 analyses the input document 402 and identifies one or more keywords such as Rose 406, Red Rose 408, etc. The user makes modifications to these keywords by adding a new keyword such as different Rose (marked as 410). Based on the keywords 406, 408 and 410, the image search module 214 searches the new images such as 412 and 414 using the one or more sources as above and further suggests the searched images 412 and 414 to the user for selection. The new image 412 represents a different colored rose such as a purple rose (although color is not shown) and the new image 414 represents a red rose (although color not shown). The user can select any of the images 412 or 414 which he wishes to add in the input document 402. Here, the user selects the purple rose image 412, where the selection is shown through the marking 416. The user also selects the area where he wishes to add the selected new image 412. For example, the user selects the area (selection shown via 415) of the existing pink rose image 404. Based on the user's selection, the image processing module 216 replaces the existing pink rose image 404 with the selected new image 412 and results into an output document 418. The output document 418 finally includes the new image of purple rose 412 as selected by the user. Here, the output document 418 includes the 'Purple Rose' image 412 in place of the existing 'Pink Rose' image 404. This way, the disclosure allows the user to add a new image in the input document based on his choice without any manual effort needed by the user.

In the implementation 420 of FIG. 4B, the user wishes to add a new image in addition to an existing image and selects the same option 405 i.e., manual keyword selection option as shown in FIG. 4A. Here the input document 402 already includes the image 404 of a pink rose (although color not visible) and the text content 403. The keyword search module 212 identifies keywords 406 and 408 which are further modified by the user. For example, the user adds a new keyword such as different rose (marked as 410). The image search module 214 then performs search to find new images relevant to the keywords 406, 408 and 410. As shown, the image search module 214 finds the new images such as 412 and 414 and displays to the user for selection. The new image 412 represents a different colored rose such as a purple rose (although color is not shown) and the new image 414 represents a red rose (although color not shown). The user can select any of the images 412 or 414 which he wishes to add in the input document 402. The user selects the image 412 and wishes to add it on a new page. Based on the user selection of the new image 412 and the area for adding the new image 412, the image processing module 216 adds a new page 421 to the input document 402 and further adds the selected new image 412 to the new page 421, resulting into an output document 422. Here, the output document 422 includes the new page 421 and previous page, marked as 419. Further, the image processing module 216 resizes the selected image 412 such that it fits appropriately on the new page 421.

In the implementation 440 of FIG. 4C, the user wishes to add a new image in place of the existing image and selects an automatic keyword selection option 441. Here the input document 402 includes an image 404 of a pink rose (color not visible) and the text content 403. The keyword search module 212 identifies keywords (marked as 406, 408, and 410) which are directly used by the image search module 214 for searching. The image search module 214 searches for new images based on the keywords and displays the new images such as 412 and 414 to the user for selection. The user selects the new image 412, the selection shown via 416. The user further selects the area of the existing image 404 (selection shown as 415) for adding the new image 412. The image processing module 216 adds the selected image 412 in place of the existing image 404 and finally results into an output document 418. The output document 418 includes the new image 412 based on user's choice.

The implementation of FIG. 4C is similar to the implementation of FIG. 4A. In implementation of FIG. 4C, the user selects the automatic keyword selection option 441, where the keyword search module 212 automatically identifies and finalizes the keywords for searching new images without any input from the user but according to FIG. 4A, the user selects the manual keyword selection option 405 where the keywords identified by the module 212 are shown to the user for his confirmation and/or any inputs on the keywords.

Although the above implementations of FIGS. 4A-4C show that 2 new images are searched by the image search module 214 or shown to the user for selection, but there may be variations to the number of images searched and further displayed to the user without limiting the scope.

Exemplary Flowchart

Figure 5:
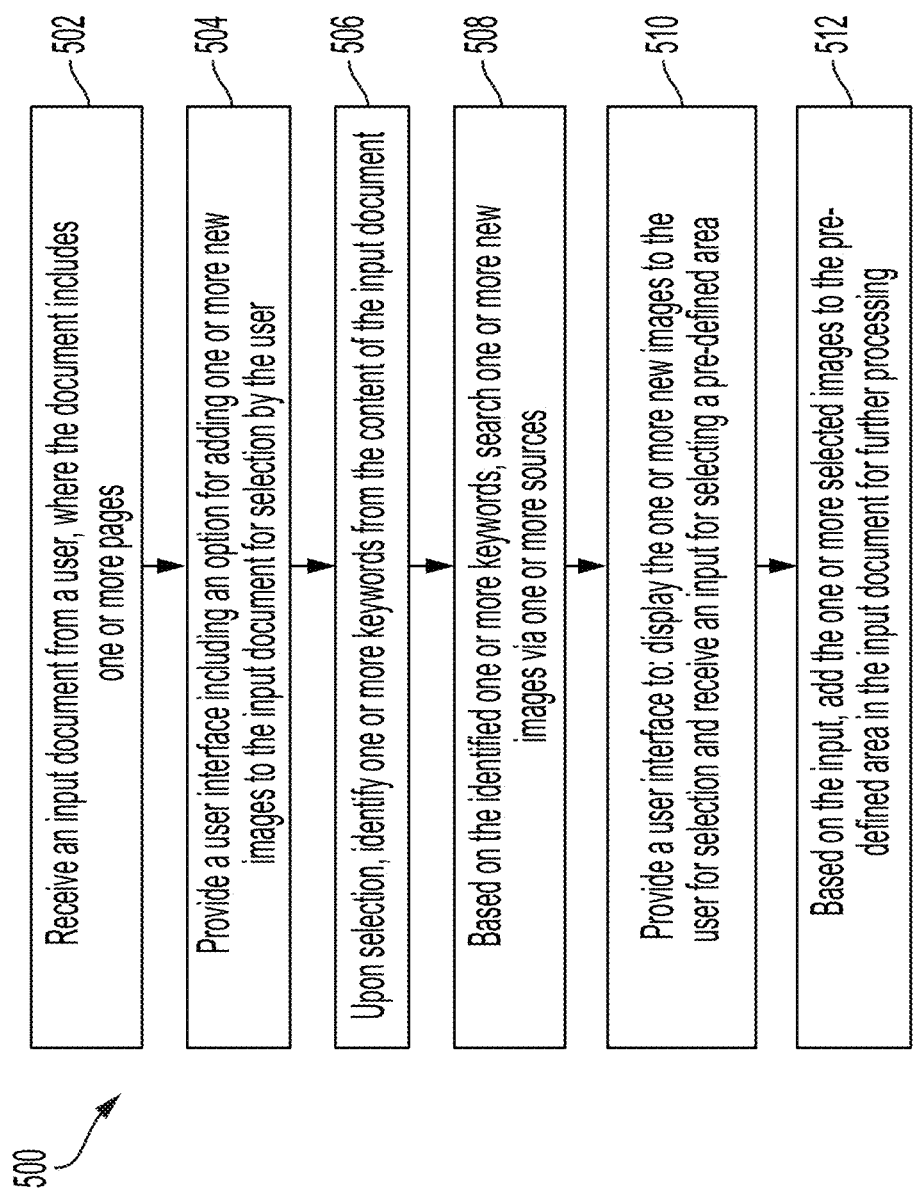
FIG. 5 is a method flowchart for allowing a user to add one or more new images to an input document, in accordance with an embodiment of the present disclosure.

FIG. 5 illustrates an exemplary method 500 for adding one or more new images to an input document. The method 500 can be implemented at a multi-function device. Alternatively, the method 500 can be implemented at a system where some blocks are implemented at a multi-function device and some blocks are implemented at a server. The method may be implemented at a print driver of a computing device. For easy understanding, the method 500 is discussed with respect to the multi-function device.

The method 500 begins at 502, where an input document having one or more pages is received at a multi-function device such as 102, and a user wishes to add one or more new images to the input document. Here, it can be considered that the user wishes to replace an existing image with one or more new images. The input document includes content in the form of text, at least one image, graphics, or a combination thereof. The input document is a digital document that is submitted by the user for printing at the multi-function device.

Once the input document is received at the multi-function device, a user interface with an option of adding one or more new images to the input document is provided to the user for selection, at 504. Once the user selects the option, the user interface further provides two sub-options to either add a new image or replace an existing image. The user can select either or both the options. In the exemplary method 500, the user selects the sub-option to replace an existing image. Upon selection, a user interface further provides options for keywords—whether the user wishes to add keywords manually or he wishes to add keywords automatically. In the former option, the user is displayed a list of keywords via a user interface and he can select/edit/add one or more keywords for searching the relevant images. In the latter option, the user is not required to provide any inputs on the identified keywords, but the multi-function device automatically uses the identified keywords for searching the new images. The user may select the manual option if he wishes to provide specific one or more keywords based on which the images are to be searched. Else, the user may select the other option.

Upon selection, the input document is parsed completely to identify one or more keywords, at 506. The keywords are identified based on the content of the input document. The keywords may be identified based on their frequency of occurrence in the document, or based on their presence near existing images, etc. For example, if the input document includes an image of a vehicle and the document mentions 'electric vehicle' as a caption of the image, one of the keywords identified may be 'electric vehicles'. In another example, if the input document includes a word 'unmanned aerial vehicle' that appears very frequently, then the keywords identified may be 'UAVs', 'drones' 'unmanned aerial vehicles', and so on.

After this, the keywords are used to search for one or more new images related to the keywords via one or more sources, at 508. Various examples of the sources may be image database, cloud database, the Internet, or the like. For example, if the keyword is 'flower', then the images related to flower are searched. In another example, if the keyword is DC motor, then images related to DC motor are searched.

Once images are searched, the searched images are displayed to the user for selection via a user interface, at 510. The user can select any or all images based on his preference. The user is further shown an option to select a pre-defined area in the input document. The pre-defined area is a particular area/location/place where the user wishes to add the selected new images in the input document. For example, the user may select an area occupied by an existing image such that the selected new image can be added therein. This way, the user's selection/input of the pre-defined area is received at 510.

Based on the above, the image is added to the selected pre-defined area in the input document, at 512, resulting in an output document. If the user input for the pre-defined area is an area of a pre-existing image, the new image is added to the area of the pre-existing image in the input document. If the user input for the pre-defined area is a new area on a pre-defined page, the new image is added to the new area on the pre-defined page. The pre-defined page may be the same page having the pre-existing image. If the user input for the pre-defined area is a new page, the new page is added to input document first and then the new image is added to the new page.

In one example, the new selected image is added by deleting the existing image and then adding the new image at its place. In another example, the new image is superimposed on the existing image. The output document is further processed by the multi-function device. For example, if the user wishes to print, the output document is printed. If the user wishes to store, the output document is stored as desired by the user such as in USB, hard disk, memory, cloud location or the like. But if the user wishes to send the output document to himself or other users, the output document can be sent via email.

For easy discussion, the method 500 is discussed with respect to adding one new image to the input document but any number of the new images can be automatically added to the input document based on the user's choice and/or requirement.

The method 500 may be implemented in the form of non-transitory computer-readable medium storing instructions, which when executed by one or more processors cause the one or more processors to implement the method blocks 502, 504, 506, 508, and 510, and 512.

In the above discussion, the disclosure can be implemented at a multi-function device, or at a system i.e., a multi-function device and a server. But the disclosure can be implemented at a computing device having a print driver. In such implementations, the print driver includes an option for adding one or more new images to an input document. The option can be included anywhere in the print driver, where print parameters options are included. The user selects the option to add one or more new images to the input document. Based on the user selection, the print driver adds the one or more new images to the input document, resulting into an output document, as discussed above in detail. The print driver then sends the output document to a multi-function device communicatively coupled to the computing device, for further processing, such as printing, sharing via email, storing in a storage medium such as USB. Here, the print driver performs all functionalities for adding the new images such as keyword identification, image searching, image processing and so on.

In some implementations, the print driver simply provides the option for adding the new images, the user can select the option. The selected option, other print parameters and the input document is then sent to a multi-function device such as 102. The multi-function device then adds the new images and processes the output document as discussed above in detail.

The present disclosure provides methods and systems for adding one or more new images to an input document. The methods and systems allow the user to add the new images simply either by replacing existing images or by adding the new images in addition to the existing images. The one or more new images may be substitute images or be images additional to the pre-existing images in the input document. The methods and systems automatically add the new images based on user's choice. The methods and systems provide a user-friendly approach such that the user requires to simply select any new images from a list of searched images for addition. The methods and systems overall save huge time and effort of the user. The methods and systems automatically resize the new selected images based on the predefined area where the new images are to be added. The methods and systems additionally automate the search of keywords in the input document. The methods and systems allow the user to add the new images anytime even after the input document is sent for printing or scanning as well as allows the user to add the new images before the input document is submitted for printing.

The new images can be added such that the new images are more descriptive or informative and helps the user to have a better/enhanced understanding of the content of the input document. The new images can be added to enhance the input document. The new images can be added for a better-quality image or better version of the existing images. These are few examples, but the disclosure can be implemented for any scenario where the user wishes to add the new images to the input document without limiting the scope of disclosure.

Although the disclosure is discussed with respect to a multi-function device, but the disclosure may be implemented in form of an app which can be installed on any user device, for example, a mobile device. If the user device is a desktop, then the app may be a desktop app. If the user device is a mobile device, then the app may be a mobile app. For easy discussion, the scenario is discussed with mobile app as an example. The mobile app is configured such that the app allows the user to add one or more new images to the input document. If the input document is in the form of a digital document, the user can directly provide the input document by uploading it. But if the input document is in the printed form, the input document is first converted into a digital form. For example, the input document can be scanned via a camera of the mobile device or other ways. Here, the mobile app accesses the camera of the mobile device and requests the user to scan the input document. This way, the digital version of the input document is obtained. Once the input document is obtained, the mobile app starts processing the input document by identifying one or more keywords based on the content of the input document. In some implementation, the identified keywords may be provided to the user through a user interface of the app, for any modification such as addition, deletion, editing the keywords and so on. Based on the identified keywords, the mobile app searches for one or more new images related to the keywords. The relevant images may be searched on the Internet, a cloud storage, in the memory of the mobile device, third party image database, or the like. The one or more searched images are further shown to the user for selection, through a user interface of the mobile app. The user can select any new image which is added to the input document, finally resulting into an output document. The new image is added to the user's desired area. The output document includes the new image along with the content. The output document can be shared with the user or other users via email. The output document can be sent for printing to a multi-function device such as 102, 104, 200 and 220. The output document can be stored anywhere such as USB, hard disk, cloud storage or the like. In the current implementation, the mobile app may be coupled to a server for performing functionalities such as keyword identification, image searching and image addition to the input document. But the mobile app can be configured to perform all functionalities standalone.

Note that throughout the above description, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, identifying, searching, scanning, sending, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for automatically adding one or more new images to an input document based on user's choice, the method comprising:
   receiving an input document from a user, wherein the document comprising one or more pages;
   providing a user interface comprising an option for adding one or more new images to the input document for selection by the user;
   upon selection of the option, for adding the one or more new images to the input document, by the user, identifying one or more keywords based on the content of the input document;
   based on the identified one or more keywords, searching one or more new images via one or more sources;
   providing a user interface for:
      displaying the one or more new images to the user for selection;
      receiving an input that indicates a pre-defined area in the input document where the user wishes to add the one or more new images; and
   based on the input, adding the one or more new images to the pre-defined area in the input document, resulting in an output document, for further processing.

2. The method of claim 1, wherein the input document is received from the user for printing or is obtained after scanning.

3. The method of claim 1, further comprising, allowing the user to perform at least one of: selecting a specific keyword from the identified one or more keywords, modifying the identified one or more keywords, and adding one or more new keywords to the identified one or more keywords.

4. The method of claim 1, wherein adding the one or more new images to a pre-defined area comprises at least one of: adding the one or more new images to an area of a pre-existing image in the input document and adding the one or more new images to a new area on a pre-defined page.

5. The method of claim 1, wherein adding the one or more new images to a pre-defined area comprises adding the one or more new images to a new page.

6. The method of claim 1, wherein the input option for adding the one or more new images comprises: a new page, an area of a pre-existing image, and a new area on a pre-defined page.

7. The method of claim 1, further comprising showing a preview of the output document having the one or more new images, to the user for confirmation.

8. The method of claim 1, wherein further processing comprises at east one of:
    printing the output document having the one or more new images at a multi-function device;
    sending the output document having the one or more new images via an email; and
    storing the output document having the one or more new images in a storage device.

9. The method of claim 1, wherein adding comprises at least one of:
    adding the one or more new images in the input document; and
    replacing a pre-existing image in the input document with the one or more new images in the input document.

10. A multi-function device for automatically adding one or more new images to an input document, the mufti-function device comprising:
    a controller for:
    receiving an input document from a user, wherein the input document comprising one or more pages;
    identifying one or more keywords based on the content of the input document;
    based on the identified one or more keywords, searching one or more new images via one or more sources;
    receiving an input that indicates a pre-defined area in the input document where the user wishes to add the one or more new images; and
    based on the input, adding the one or more new images to the pre-defined area in the input document, resulting in an output document, for further processing; and
    a user interface for:
        providing an option for adding the one or more new images to the input document for selection by the user, wherein the one or more keywords are identified upon selection of the option by the user; and
        displaying the one or more new images to the user for selection.

11. The multi-function device of claim 10, wherein the user interface allows the user to perform at least one of: selecting a specific keyword from the identified one or more keywords, modifying the identified one or more keywords, and adding one or more new keywords to the identified one or more keywords.

12. The multi-function device of claim 10, wherein the controller adds the one or more new images to a predefined area comprises at least one of: adding the one or more new images to an area of an existing image and adding the one or more new images to a new area on a pre-defined page.

13. The multi-function device of claim 10, wherein the controller adds the one or more new images to a pre-defined area comprises adding the one or more new images to a new page.

14. The multi-function device of claim 10, wherein the controller searches the one or more new images related to the selected keywords via one or more sources.

15. The multi-function device of claim 10, wherein the pre-defined area comprises at least one of: an area of an existing image, a new area on a pre-defined page, and a new page.

16. The multi-function device of claim 10, wherein further processing comprises at least one of:
    printing the output document having the one or more new images;
    sending the output document having the one or more new images via an email; and
    storing the output document having the one or more new images in a storage device.

17. The multi-function device of claim 10, wherein the user interface further provides a preview of the output document comprising the one or more new images to the user for confirmation.

18. A system for automatically adding one or more new images to an input document, the system comprising:
    a multi-function device for:
        receiving an input document from a user, wherein the document comprising one or more pages;
        providing a user interface comprising an option for adding one or more new images to the input document, for selection by the user; and
    a server communicatively coupled to the multi-function device, wherein the server is for:
        upon selection of the option, for adding the one or more new images to the input document, by the user, identifying one or more keywords based on the content of the input document;
        based on the identified one or more keywords, searching for one or more new images via one or more sources;
        suggesting the one or more new images to the user, via a user interface, for selection;
        receiving an input that indicates a pre-defined area in the input document where the user wishes to add the one or more new images; and
        based on the input, adding the one or more new images to the pre-defined area in the input document, resulting in an output document, for further processing.

19. The system of claim 18, wherein adding the one or more new images to a predefined area comprises at least one of: adding the one or more new images to an area of an existing image and adding the one or more new images to a new area on a pre-defined page.

20. The system of claim 18, wherein adding the one or more new images to a predefined area comprises adding the one or more new images to a new page.

* * * * *